Dec. 2, 1947.  E. G. MAYS  2,431,877
AUTOMATIC UNLOADING DEVICE FOR BUCKRAKE HAY STACKERS
Filed Feb. 19, 1946  2 Sheets-Sheet 1
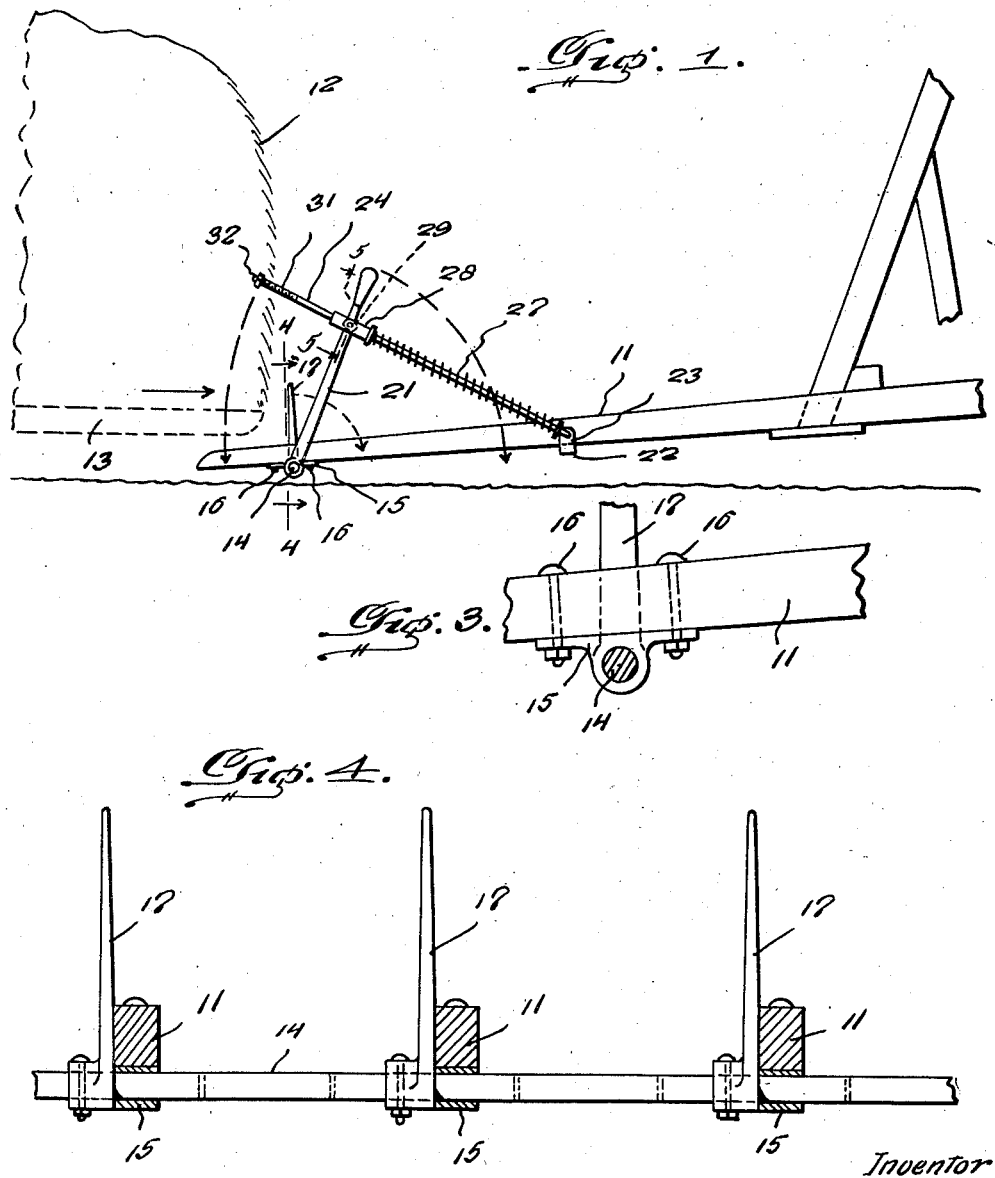
Inventor
Emlen G. Mays,
Attorneys Dec. 2, 1947.  E. G. MAYS  2,431,877
AUTOMATIC UNLOADING DEVICE FOR BUCKRAKE HAY STACKERS
Filed Feb. 19, 1946  2 Sheets-Sheet 2
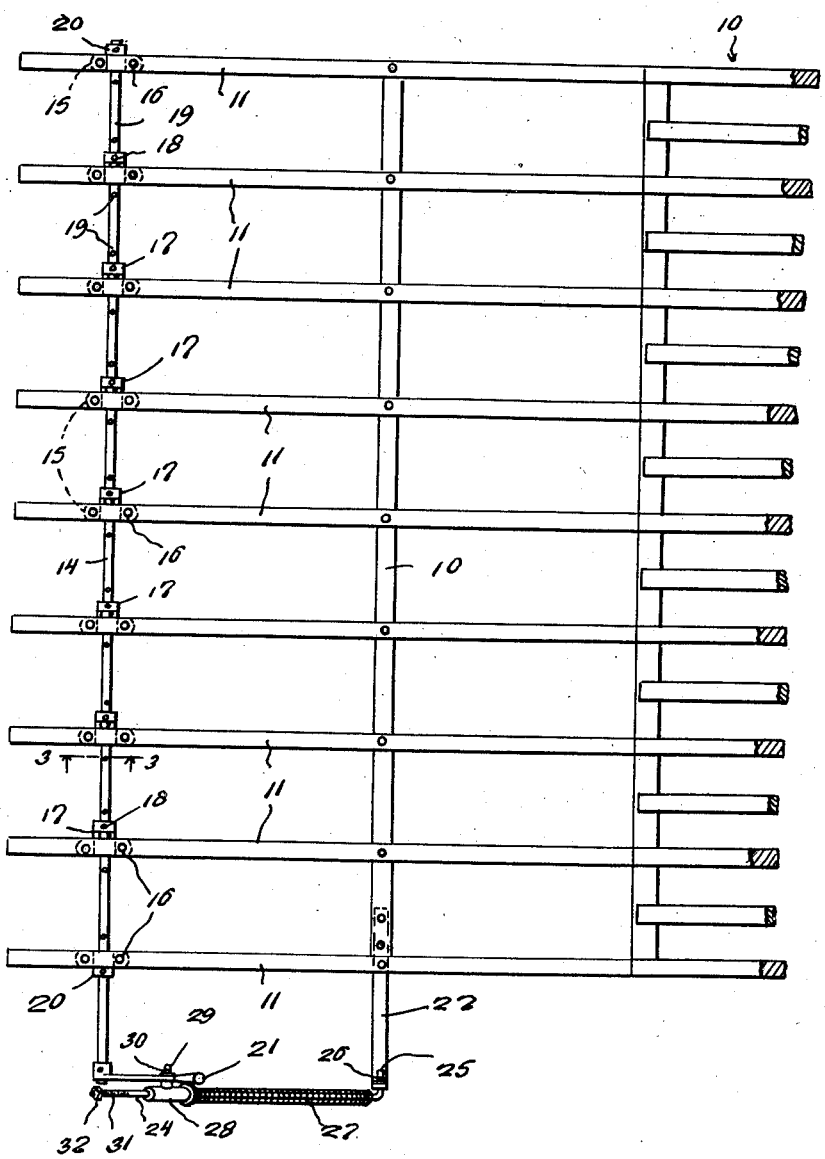
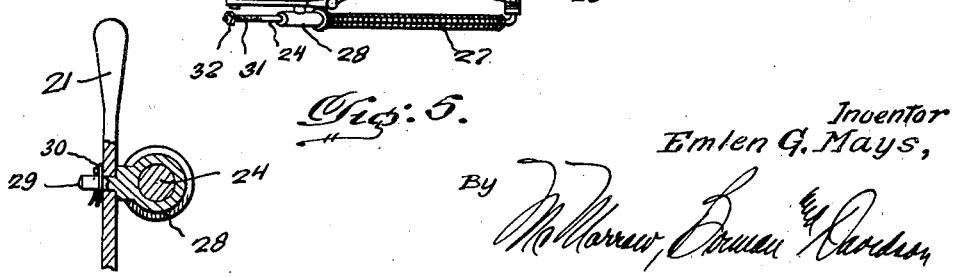
Inventor
Emlen G. Mays,
Attorneys Patented Dec. 2, 1947

2,431,877

UNITED STATES PATENT OFFICE 2,431,877

AUTOMATIC UNLOADING DEVICE FOR BUCK RAKE HAY STACKERS

Emlen G. Mays, Howe, Idaho

Application February 19, 1946, Serial No. 648,684

4 Claims. (Cl. 214—144)

My invention relates to buckrake hay stackers and more particularly to automatic hay retainers for such stackers.

The object of my invention is to provide an automatic hay retainer which can be easily and cheaply attached to a buckrake hay stacker.

Another object of my invention is to provide an automatic hay retainer which can be used in connection with bull rakes of different sizes and makes.

A further object of my invention is to provide a hay retainer which can be released easily and without loss of time from the bull rake in case the retainer teeth should be caught accidentally in the rake.

Other objects of my invention may appear in the following specification describing my invention with reference to the accompanying drawings illustrating a preferred embodiment of my invention. It is, however, to be understood that my invention is not to be limited or restricted to the exact construction and combination of parts described in the specification and shown in the drawings, but that such changes and modifications can be made which fall within the scope of the claims appended hereto.

In the drawings:

Figure 1 is a side elevatonal view of a stacker equipped with a hay retainer according to my invention, a bull rake with a load of hay being indicated in broken lines in position to start to unload the hay on the stacker.

Figure 2 is a top plan view of a stacker equipped with a hay retainer according to my invention.

Figure 3 is a sectional view taken on line 3—3 in Figure 2 shown in a bigger scale.

Figure 4 is a sectional view shown in a bigger scale and taken on line 4—4 in Figure 1 and Figure 5 is a sectional view taken on line 5—5 in Figure 1.

Referring now in detail to the drawings the stacker indicated in Figures 1 and 2 has a head frame 10 to which stacker teeth 11 are attached. A load of hay 12 is resting on the bull rake teeth 13. Adjacent the free ends of the stacker teeth 11 a shaft 14 is rotatably arranged underneath said teeth by means of bearings 15 fastened underneath the stacker teeth by bolts 16.

Between each pair of stacker teeth 11 a retainer tooth 17 is fastened to the shaft 14 by a bolt 18. To make it possible to arrange the retainer teeth at different intervals from each other, additional holes 19 are provided in the shaft 14.

Adjacent the outside surfaces of the two outermost stacker teeth 11 collars 20 are rigidly fastened on the shaft to prevent axial movement thereof in the bearings 15. On one side the shaft 14 extends beyond the collar 20 and on this end a lever 21 is rigidly mounted. Underneath the foremost member of the stacker head 10 on the side of the stacker on which the lever 21 is located an angle bracket 22 is fastened to said member and extends laterally from the stacker head. The bracket has an upwardly extending element 23 having a hole therein. A round rod 24 has on one of its ends a finger 25 bent at right angles to the rod and this finger is pivotally arranged in the hole in the upright member 23 of the bracket 22. A cotter pin 26 prevents accidental removal of the finger 25 from the bracket 22.

A spiral spring 27 surrounds the rod 24 and abuts the bracket 22 with one of its ends. A sliding sleeve 28 is mounted on the rod 24 and has a laterally extending pivot pin 29 formed thereon, which is extended through a hole in the lever 21 and is secured against accidental removal therefrom by a cotter pin 30. The spring 27 abuts this sliding sleeve with its other end. The free end of the rod 24 is threaded as shown at 31 and a nut 32 engages this thread and prevents excessive sliding of the sleeve 28.

To start the operation of the stacker the connection between the rod, 24, sleeve 28 and lever 21 is arranged so that the retainer teeth 17 will stand upright. A load of hay 12 on a bull rake 13 is pushed onto the stacker. Thereby the retainer teeth 17 will be pivoted inwardly into approximately horizontal position rotating the shaft 14 and pivoting the lever 21 so that it will cause the sleeve 28 to slide on the rod 24, compressing the spring 27.

When the load of hay is on the stacker so far that its back edge is near the end of the retainer teeth 17, the rake 13 is backed out from underneath the hay. The spring 27 is pushing the sleeve 28 toward the end of the rod 28 thereby pivoting the lever 21 and the retainer teeth 17 into upright position, so that the hay will be retained on the stacker.

In case the rake operator should drive accidentally too far onto the stacker, so that the retainer teeth 17 will catch onto the rake and prevent backing out, the lever 21 is pushed forward until it is arranged parallel to the rod 24. Then the pivot fingers 25 and 29 are on or beyond dead center holding the retainer teeth down so that the bull rake can be backed out.

The additional holes 19 in the shaft 14 permit the retainer teeth 17 to be arranged on the shaft so that they can reach upwardly between the rake teeth 13 no matter what the center to center dimension of the rake teeth may be.

Having described my invention, what I claim and desire to secure by Letters Patent is:

1. A hay stacker having a stacker head and a plurality of stacker teeth thereon including a shaft rotatably mounted underneath the stacker teeth, a plurality of retainer teeth mounted on the shaft, a lever rigidly mounted on the shaft, a rod pivotally connected with the stacker head, a sliding sleeve on the rod and pivotally connected with the lever and a spring surrounding the rod between the stacker head and the sliding sleeve and urging the retainer teeth into upright position.

2. A hay stacker having a stacker head and a plurality of stacker teeth thereon including a shaft rotatably mounted underneath the stacker teeth, a plurality of retainer teeth on the shaft, a lever rigidly mounted on the shaft, an angle bracket fastened to the stacker head, a rod pivotally connected with the bracket, a sliding sleeve on the rod, a pivot finger on the sleeve pivotally engaging the lever, a spring surrounding the rod between the bracket and the sleeve and urging the retainer teeth into upright position and a nut adjustably mounted on the rod and adjustably limiting the sliding movement of the sleeve on the rod.

3. In a hay stacker having a stacker head and a plurality of stacker teeth thereon, a shaft rotatably mounted under the stacker teeth, a plurality of retainer teeth mounted on the shaft, a swingable member mounted on the shaft, a second swingable member mounted on the stacker head, and a resilient lost motion connection between said swingable members.

4. In a hay stacker having a stacker head and a plurality of stacker teeth thereon, a shaft rotatably mounted under the stacker teeth, a plurality of retainer teeth mounted on the shaft, a swingable member mounted on the shaft, a second swingable member mounted on the stacker head, and a connection between the swingable members comprising a sleeve slidable on one of said members and pivotally connected to the other and a coil compression spring surrounding said second-mentioned swingable member abutting said sleeve at one end and a fixed surface adjacent the other end at the pivot point of said second-mentioned swingable member.

EMLEN G. MAYS.

REFERENCES CITED

The following references are of record in the file of this patent:

UNITED STATES PATENTS

| Number | Name | Date |
| --- | --- | --- |
| 932,524 | Weddle | Aug. 31, 1909 |
| 934,827 | McCreery | Sept. 21, 1909 |
| 936,500 | Whitney | Oct. 12, 1909 |
| 1,210,393 | Amman | Jan. 2, 1917 |